United States Patent [19]

Suzuki et al.

[11] Patent Number: 4,959,574
[45] Date of Patent: Sep. 25, 1990

[54] PRECISION GAP MAGNETIC ENCODE DEVICE

[75] Inventors: Hidemasa Suzuki; Ichiro Tokunaga, both of Furukawa; Hiraku Abe, Miyagi; Yasuaki Ogawa, Furukawa, all of Japan

[73] Assignee: Alps Electric Co., Ltd., Tokyo, Japan

[21] Appl. No.: 332,640

[22] Filed: Mar. 31, 1989

[30] Foreign Application Priority Data

May 28, 1988 [JP] Japan ................... 63-129461

[51] Int. Cl.⁵ .................... H02K 15/00; H02K 5/26
[52] U.S. Cl. .................... 310/91; 156/275.7; 310/42; 324/207.13
[58] Field of Search .............. 310/68, 71, 91, 170, 310/268; 324/173, 174, 208; 341/15; 29/596; 156/272.2; 2/272.2, 273.3, 273.5, 275.5, 275.7

[56] References Cited

U.S. PATENT DOCUMENTS

| 4,377,088 | 3/1983 | Evert ................... 324/208 |
| 4,694,688 | 9/1987 | Takahashi et al. ........... 73/116 |
| 4,731,580 | 3/1988 | Indo .................... 324/208 |
| 4,737,675 | 4/1988 | Maemine et al. ........... 310/71 |

FOREIGN PATENT DOCUMENTS 194168  5/1985  Japan ................... 341/15

*Primary Examiner*—Peter S. Wong
*Assistant Examiner*—D. L. Rebsch
*Attorney, Agent, or Firm*—Guy W. Shoup; David H. Carroll

[57] ABSTRACT

A magnetic rotary encoder device wherein fluctuation of a magnetic gap arising from a change in temperature is minimized, a printed circuit board on which an electric circuit electrically connected to a magnetic sensor is carried can be assembled readily, and a magnetic gap can be adjusted readily. The magnetic encoder device comprises a magnetic scale having thereon a magnetic code which can be detected by a magnetic sensor, a retaining member for securely retaining the magnetic sensor on a sensor mounting element with a magnetic gap left between the magnetic scale and the magnetic sensor, and a supporting member to which the retaining member is secured. A first bonding agent and a second, softer bonding agent secure the supporting member and portions of the sensor mounting element adjacent and remote from the supporting member to each other, respectively.

10 Claims, 8 Drawing Sheets

PRECISION GAP MAGNETIC ENCODE DEVICE

BACKGROUND OF THE INVENTION

1. Field of the Invention

This invention relates to a magnetic encoder, and more particularly to providing an adjustable gap between a magnetic drum and a magnetic sensor.

2. Description of the Prior Art

FIG. 10 shows a conventional magnetic encoder which is disclosed in Japanese Utility Model Laid-Open No. 62-3012.

The magnetic drum 1 serving as a magnetic scale is made of a magnetic material and has a magnetization pattern formed on an outer circumferential periphery thereof. The magnetization pattern is formed by a plurality of magnetic pole pairs arranged at equal circumferential intervals such that adjacent successive pairs of magnetic poles have the polarities N (north), S (south), S, N, N, S, S, N, . . . . The rotary shaft 3 extends outwardly from the rotating machine 2 and is securely mounted at the center of the magnetic drum 1. A step 2a serving as a datum clamp face is formed on the surface of the rotating machine 2, and the base member 4 is screwed to the step 2a. The base member 4 has a disk-like configuration and has an upper reference face 4a extending perpendicularly to the axis of the rotary shaft 3. The retaining member 5 is screwed to the reference face 4a of the base member 4. The magnetic sensor 6 which may consist of a pair of magneto-resistance effect elements is attached to the retaining member 5 so that it faces and is spaced from the circumferential face of the magnetic drum 1. Components 11 of an electric circuit for processing an electric signal from the magnetic sensor 6 are carried on the printed circuit board 7. The printed circuit board 7 is secured to the base member 4 by means of a plurality of screws 12 extending through the support tubes 9 and is located above the magnetic drum 1. The lead line 8 is connected at an end thereof to the magnetic sensor 6 and at the other end thereof to the printed circuit board 7. The cover 10 is mounted on top of the rotating machine 2 so as to prevent dust from entering the magnetic drum 1, magnetic sensor 6 and so on.

The two magneto-resistance effect elements of the magnetic sensor 6 are arranged in a circumferentially spaced relationship and separated by a distance equal to $np+\frac{1}{4}\cdot p$ where p is a pitch of the magnetic poles of the magnetization pattern on the magnetic drum 1 and n is an integer. These elements also are arranged in an opposing relationship to the magnetization pattern such that magnetic paths thereof may be directed perpendicularly to the rotary shaft 3. When the magnetic drum 1 is rotated in a predetermined direction by the rotating machine 2, the magneto-resistance effect elements of the magnetic sensor 6 develop two continuous signals having a difference in phase equal to 90 degrees. The two signals are conveyed via the lead line 8 to the printed circuit board 7 where they are processed for amplification, detection and matching to produce incremental pulses from which the displacement and the direction of rotation of the magnetic drum are determined.

In a magnetic rotary encoder as described above, the retaining member 5 is screwed to the base member 4 and the gap between the magnetic sensor 6 and the magnetic drum 1 must be adjusted properly in order that the magnetic sensor 6 may reproduce the magnetization pattern of the magnetic drum 1 with high sensitivity. Unfortunately, the setting of the gap may be upset as the screw is tightened or when the screw is loosened by vibrations from the outside during use. Therefore, a bonding agent is sometimes used to secure the retaining member 5 to the base member 4. However, where a bonding agent is used as a securing means for the retaining member 5, the setting of the gap may be upset by expansion or contraction with temperature of the materials used. It is to be noted that the problem is not recognized by Japanese Utility Model Laid-Open No. 62-3012 mentioned hereinabove.

Further, in the conventional magnetic rotary encoder described hereinabove, to mount the printed circuit board 7 above the magnetic drum 1, the plurality of support tubes 9 are interposed between the printed circuit board 7 and the base member 4 and the comparatively long screws 12 are screwed into the base member 4 from above the printed circuit board 7 through the individual support tubes 9. This makes mounting of the printed circuit board 7 complicated and increases the number of parts, resulting in high production cost of the magnetic rotary encoder.

The gap between the magnetic sensor 6 and the circumferential face of the magnetic drum 1 is adjusted as follows. A spacer having thickness equal to the width of the desired gap is placed between the magnetic drum 1 and the magnetic sensor 6. Then the retaining member 5 is pressed against the magnetic drum 1, then screwed to the base member 4. However, the thickness of the spacer is varied by the pressure originating from the pressing force on the retaining member 5, and the gap may be set improperly. It is also to be noted that the problem is not mentioned in Japanese Utility Model Laid-Open No. 62-3012 mentioned hereinabove.

SUMMARY OF THE INVENTION

It is an object of the present invention to provide a magnetic rotary encoder device wherein fluctuation of the gap arising from a change in temperature is minimized.

It is another object of the present invention to provide a magnetic rotary encoder device wherein a printed circuit board on which an electric circuit electrically connected to a magnetic sensor is carried can be assembled readily and the gap can be adjusted readily.

In order to attain these and other objects, according to one aspect of the present invention, there is provided a magnetic encoder device which comprises a magnetic scale having thereon a magnetic code which can be detected by a magnetic sensor, a sensor retainer for securely retaining the magnetic sensor on a housing with a gap left between the magnetic scale and the magnetic sensor to allow relative rotation between the magnetic scale and the magnetic sensor, a first bonding agent for securing a first portion of said sensor retainer to said housing, and a second bonding agent for securing a second portion of said sensor retainer to said housing wherein said second portion is farther from said magnetic sensor than said first portion and said second bonding agent is softer than the first bonding agent.

Where the sensor retainer and the housing are formed from materials having different coefficients of expansion, when the ambient temperature varies, a stress is produced due to a difference in amount of expansion which stress causes the sensor retainer and the housing to move relative each other. Here, of the first and second bonding agents, the latter is softer than the former so that the amount of movement of the sensor retainer relative to the housing is smaller at the location to which the first harder bonding agent is applied and greater at the location to which the second softer bonding agent is applied. Accordingly, the sensor which is located near the location to which the first bonding agent is applied moves little relative to the housing. In this way variation of the gap between the magnetic sensor securely mounted on the sensor retainer and the magnetic scale having the magnetization pattern thereon can be minimized.

According to another aspect of the present invention, there is provided a magnetic encoder device which comprises a rotatable magnetic scale having thereon a magnetic code which can be detected by a magnetic sensor, a housing having a sensor retainer formed in an integral relationship thereon and having the magnetic sensor securely mounted thereon so that a predetermined gap exists between a circumferential face of the magnetic scale and the magnetic sensor, and supporting leg portions having securely mounted thereon an electric circuit means which is electrically connected to the magnetic sensor mounted on the sensor retainer, the sensor retainer having thereon an attracting face to which an attracting jig may be connected for setting the gap between the magnetic scale and the magnetic sensor, the housing further having thereon a fixing means for fixing the relative positions of the magnetic scale and the magnetic sensor.

In such a magnetic encoder device, the gap between the magnetic scale and the magnetic sensor can be adjusted readily and accurately by moving the housing while the attracting face of the housing is held attracted to the attracting jig, and after such adjustment, the gap can be maintained by screwing the housing to the top surface of the rotating machine and, if necessary, by additionally using a bonding agent. Further, since a printed circuit board is placed on and secured by soldering or heat caulking to supporting leg portions formed in an integral relationship on the housing, such a support tube and a screw as required in the conventional rotary encoder device described hereinabove can be eliminated. Consequently, the number of parts can be reduced and the assembling operation facilitated.

The above and other objects, features and advantages of the present invention will become apparent from the following description and the appended claims, taken in conjunction with the accompanying drawings.

DETAILED DESCRIPTION OF THE PREFERRED EMBODIMENTS

Figure 1:
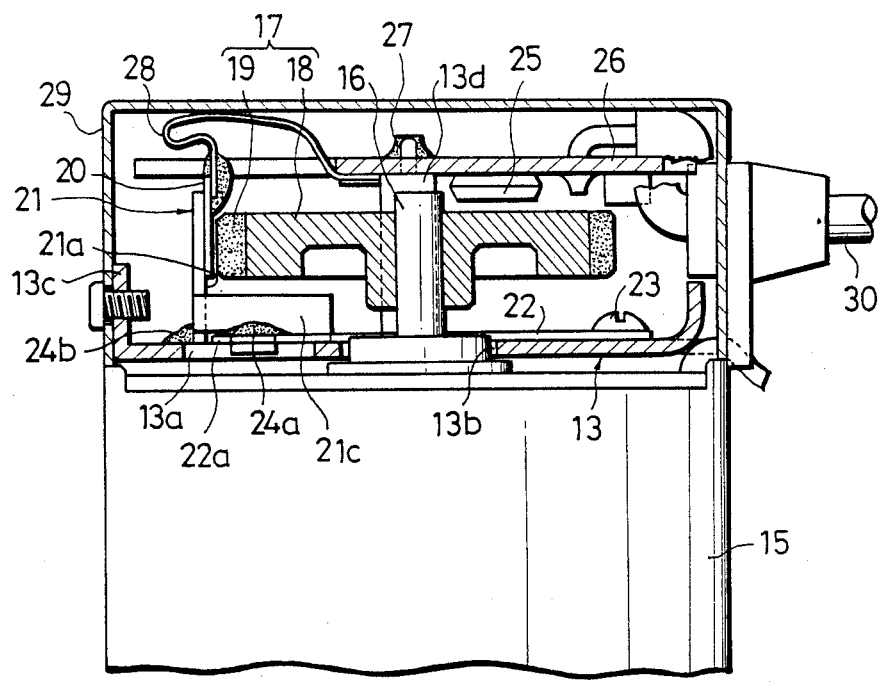
FIG. 1 is a sectional view of a magnetic rotary encoder assembled with a rotating machine showing a preferred embodiment of the present invention.
Figure 2:
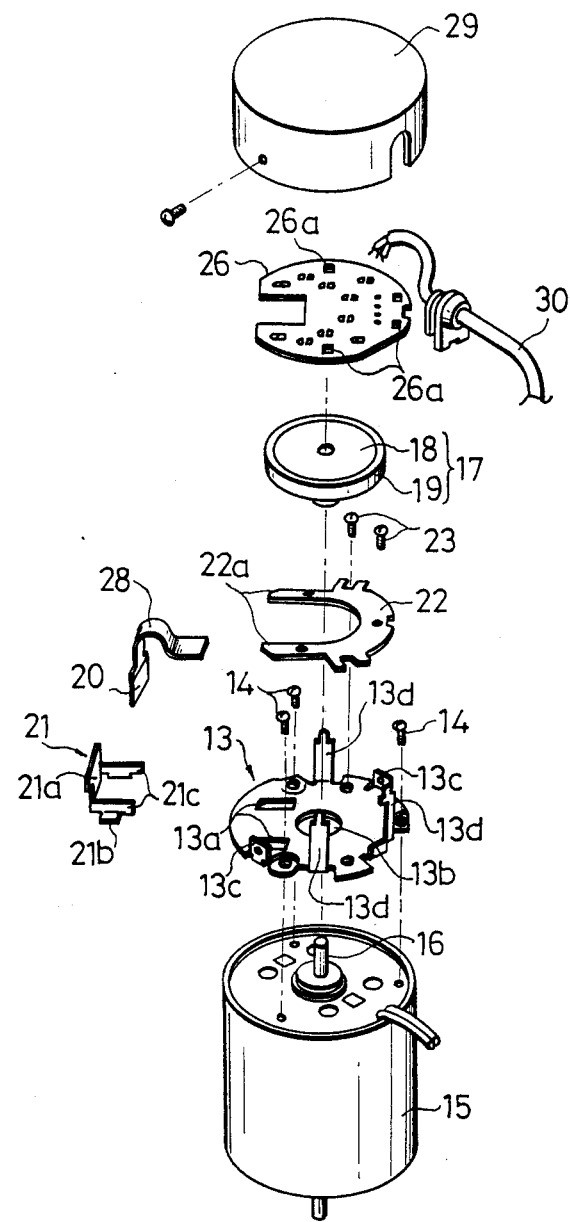
FIG. 2 is a fragmentary perspective view showing several elements of the magnetic rotary encoder of FIG. 1.

Referring first to FIGS. 1 and 2, there is shown a magnetic rotary encoder according to the present invention. The magnetic rotary encoder shown includes a housing 13 formed from a metal plate of aluminum or the like by pressing. The housing 13 has an upper face which serves as a datum clamp face for a sensor retainer which will be hereinafter described. The housing 13 has a pair of openings 13a and a center hole 13b formed in the datum clamp face thereof, and has three short mounting tabs 13c and three bent leg pieces 13d formed on an outer peripheral edge thereof by bending. The housing 13 is securely mounted on the top surface of a rotating machine 15 by means of a plurality of screws 14. The rotating machine 15 has a rotary shaft 16 which extends upwardly through the center hole 13b of the housing 13, and a magnetic drum 17 is securely mounted on the rotary shaft 16. The magnetic drum 17 includes a rotary member 18 made of aluminum or some other suitable metal, and a magnetic member 19 made of a plastic magnet or the like and securely mounted on the outer circumferential face of the rotary member 18. The magnetic member 19 has a magnetization pattern (not shown) formed continuously on the outer circumferential periphery thereof by a magnetic recording technique such that a plurality of magnetic pole pairs are arranged at equal circumferential intervals so that adjacent successive pairs of magnetic poles have the polarities N, S, S, N, N, S, S, N, . . . .

The magnetic rotary encoder further includes a magnetic sensor 20 secured by an adhesive to a sensor retainer 21. The magnetic sensor 20 may include, for example, a pair of magneto-resistance effect elements which are arranged in a circumferentially spaced relationship and separated by a distance equal to $np + \frac{1}{4} \cdot p$ where p is a pitch of the magnetic poles of the magnetization pattern on the magnetic drum 17 and n is an integer. Magnetic sensor 20 faces and is spaced from the circumferential face of the magnetic drum 17 with a predetermined gap left therebetween. The sensor retainer 21 is formed from a flat metal plate of brass or the like by pressing and has a mounting face 21a on which the magnetic sensor 20 is mounted and a pair of leg pieces 21c each having a lug 21b at the lower end thereof. A sectional face defined by lower faces of the mounting face 21a and the leg pieces 21c of the sensor retainer 21 and having a channel-shape in plan thus serves as a datum clamp face. The lugs 21b of the sensor retainer 21 extend downwardly from the leg pieces 21c and are then bent outwardly at an angle of about 90 degrees and located in the openings 13a of the housing 13.

The magnetic rotary encoder further includes a holding plate 22 formed from an iron plate or the like and securely mounted on the upper surface of the housing 13 by means of a plurality of screw 23. The holding plate 22 is secured at the opposite free ends 22a thereof to the lugs 21b of the sensor retainer 21 by means of a second bonding agent 24a. Meanwhile, the sensor retainer 21 is secured at a lower portion of the mounting face 21a thereof to the housing 13 by means of a first bonding agent 24b. While the first bonding agent 24b and the second bonding agent 24a are made of different materials having different Young's moduli, it is necessary that, within a temperature range in normal use, the second bonding agent 24a be always softer and more flexible than the first bonding agent 24b. In the case of the present embodiment, THREE BOND EP-121, an ultraviolet ray curable epoxy resin by Kabushiki Kaisha Three Bond, is employed as the first bonding agent 24b while WORLD LOCK 836B, an ultraviolet ray, two-liquid mixture curable modified acrylic resin by Kyoritsu Kagaku Sangyo Kabushiki Kaisha, is employed as the second bonding agent 24a.

By securing the datum clamp face of the lower face of the sensor retainer 21 to the housing 13 and the holding plate 22 by adhesion in this manner, the sensor retainer 21 is mounted on the upper face of the housing 13 at the right angle with a high degree of accuracy. Consequently, the magnetic sensor 20 attached to the sensor retainer 21 is retained in a predetermined position with respect to the circumferential face of the magnetic drum 17 as described hereinabove.

A printed circuit board 26 on which circuit components 25 of a signal processing circuit are carried is mounted above the magnetic drum 17. The printed circuit board 26 is secured to the housing 13 so that the ends of the bent leg pieces 13d of the housing 13 fit into mounting holes 26a formed in the printed circuit board 26 and are soldered by solder 27 to solder lands (not shown) formed on the printed circuit board 26. The printed circuit board 26 and the magnetic sensor 20 are electrically connected to each other by a lead line 28 which may be a flexible flat cable. A cover 29 in the form of a cap is screwed to the mounting tabs 13c of the housing 13. The housing 13, magnetic drum 17, magnetic sensor 20, printed circuit board 26 and so on described above are thus protected from external dust and so on by the cover 29. The signal processing circuit on the printed circuit board 26 is connected to an external controlling circuit (not shown) by way of a harness 30 which extends outwardly from the cover 29.

The magnetic rotary encoder having such a construction as described above is assembled with the rotary shaft 16 of the motor 15 in the following manner.

Figure 3:
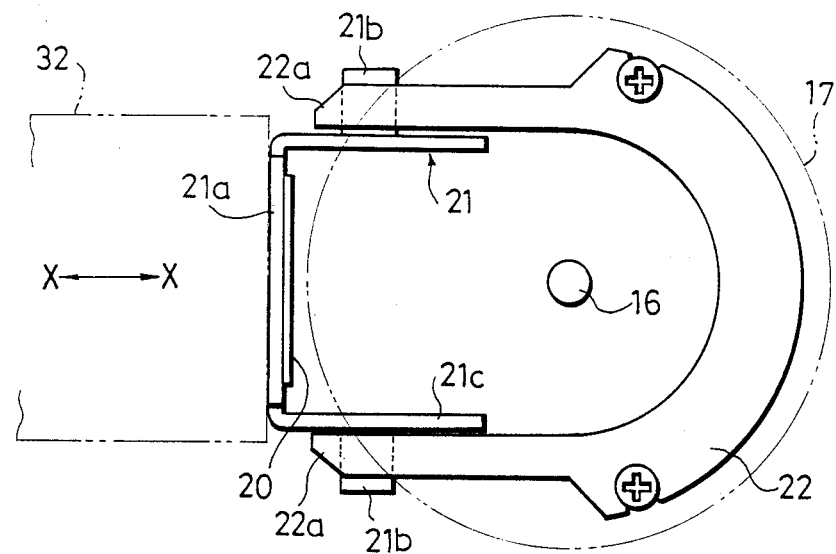
FIGS. 3 and 4 are a plan view and a side elevational view, respectively, illustrating a step of adjusting a gap in the magnetic rotary encoder of FIG. 1.

First, the housing 13 is securely mounted onto the top surface of the motor 15 by means of the screws 14, and the holding plate 22 is securely mounted onto the housing 13 by the screw 23. Meanwhile, the magnetic sensor 20 to which the lead line 28 is connected is attached to the mounting face 21a of the sensor retainer 21, and the lugs 21b of the sensor retainer 21 are inserted into the openings 13a of the housing 13 whereafter upper faces of the lugs 21b of the sensor retainer 21 are pressed and held down by the free ends 22a of the holding plates 22. Then the magnetic drum 17 is fitted onto the rotary shaft 16, and the end portions of the bent leg pieces 13d of the housing 13 are inserted into the mounting holes 26a of the printed circuit board 26, and then the solder lands (not shown) of the printed circuit board 26 and the bent leg pieces 13d of the housing 13 are secured to each other by the solder 27. Then, the other end of the lead line 28 is connected to the printed circuit board 26, and then the gap g between the magnetic sensor 20 and the circumferential face of the magnetic drum 17 on which the magnetization pattern is formed is adjusted to an optimum distance using a detecting means such as a microscope or an output meter. In this instance, if an attracting jig 32 is used and fed in the direction indicated by a double-sided arrow mark X—X in FIG. 3 perpendicular to the direction of the axis of the rotary shaft 16 while the mounting face 21a of the sensor retainer 21 is attracted and held by the attracting jig 32, then the appropriate gap g can be set readily.

Figure 4:
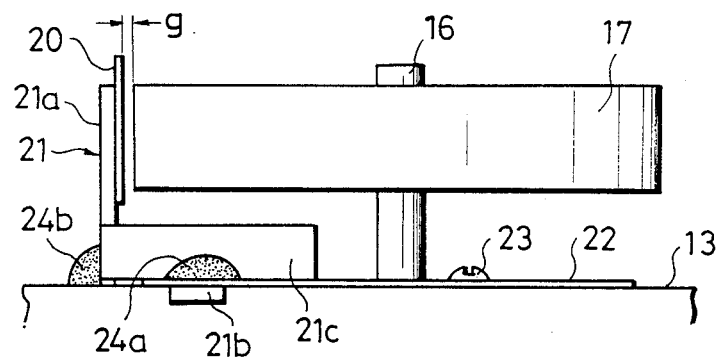

After adjustment of the magnetic sensor 20 in this manner, the condition is maintained while the second bonding agent 24a is applied between the holding plate 22 and the sensor retainer 21, that is, between the free ends 22a of the holding plate 22 and the lugs 21b of the sensor retainer 21 and is left until it cures. After that, the attracting jig 32 is retracted from the sensor retainer 21, and then the first bonding agent 24b is applied between the lower end of the mounting face 21a of the sensor retainer 21 and the housing 13 and is left until it cures, thereby completing fixation of the sensor retainer 21 (refer to FIG. 4).

Finally, the cover 29 is placed on the housing 13 over all the parts except the harness 30 and screwed to the mounting tabs 13c of the housing 13, thereby completing the assembly of the magnetic rotary encoder shown in FIG. 1.

In the magnetic rotary encoder assembled in this manner, if the ambient temperature varies, the components of the magnetic rotary encoder will expand or contract in accordance with their coefficients of expansion so that the housing 13, the holding plate 22 and the sensor retainer 21 which is secured by an adhesive to the housing 13 and holding plate 22 will move relative to each other. Since the housing 13, made of an aluminum material in the present embodiment, has a higher coefficient of linear expansion than the other two members, the amount of expansion of the housing 13 when the temperature rises is greater than the amounts of expansion of the sensor retainer 21 and the holding plate 22. However, the difference in amount of expansion is almost entirely absorbed at the locations between the lugs 21b of the sensor retainer 21 and the free ends 22a of the holding plate 22, and accordingly, near the first bonding agent 24b which is harder than the second bonding agent 24a, the mounting face 21a of the sensor retainer 21 moves but little relative to the housing 13. Since the amount of movement of the sensor retainer 21 relative to the housing 13 when the temperature varies is smaller at a location near the mounting face 21a of the sensor retainer 21 at which the magnetic sensor 20 is attached and greater at a location remote from the mounting face 21a, the sensor retainer 21 is held positioned for a long period of time relative to the housing 13 near the mounting face 21a which determines the accuracy of the gap.

It is to be noted that holding plate 22, which is used to keep sensor retainer 21 in position before sensor retainer 21 is attached to housing 13 by adhesive 24b, can be omitted if the sensor retainer 21 is held on the housing 13, for example, by means of a holding jig or the like. Also in this instance, a portion of the sensor retainer 21 remote from the mounting face 21a will be adhered to the housing 13 by the second bonding agent 24a while another portion of the sensor retainer 21 near the mounting face 21a will be adhered to the housing 13 by means of the first bonding agent 24b.

Figure 5:
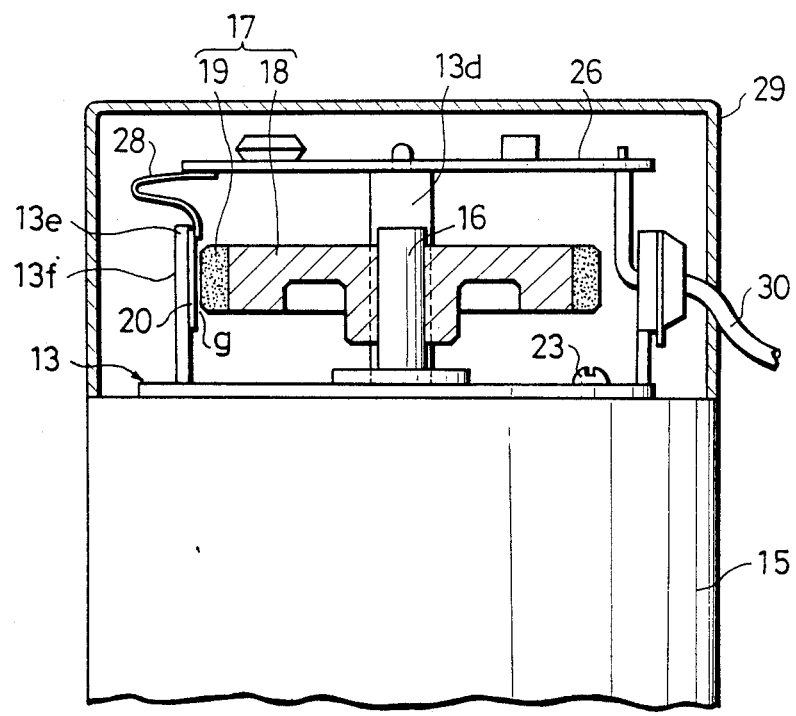
FIG. 5 is a sectional view of another magnetic rotary encoder assembled with a rotating machine showing a second embodiment of the present invention.
Figure 6:
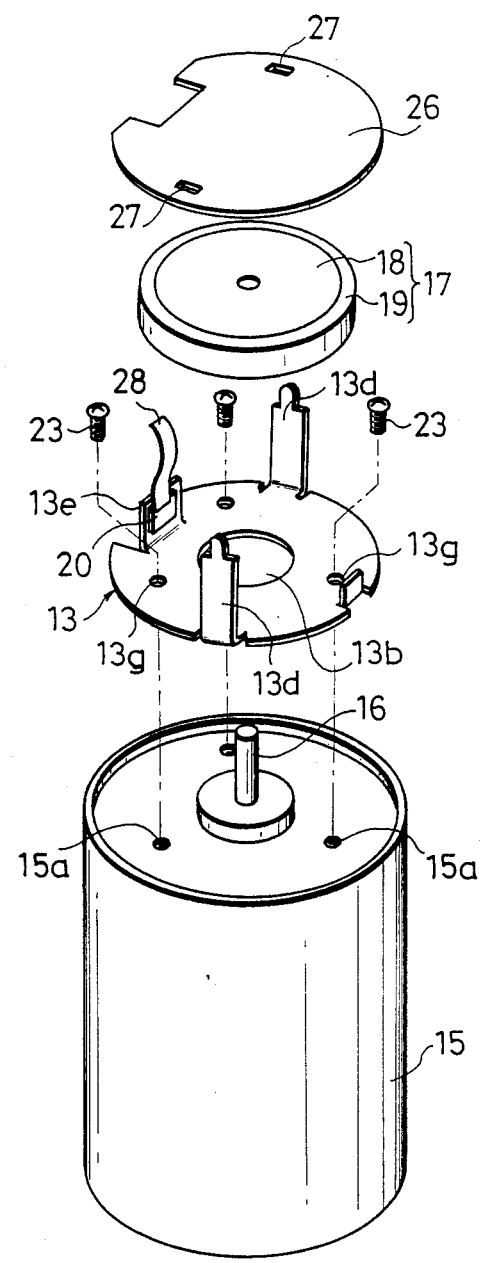
FIG. 6 is a fragmentary perspective view showing several components of the magnetic rotary encoder of FIG. 5.

Referring now to Figs. 5 and 6, there is shown a magnetic rotary encoder according to a second embodiment of the present invention. The magnetic rotary encoder shown includes a housing 13 formed from a metal plate by pressing. The housing 13 has a center hole 13b perforated at the center thereof and a plurality of perforations 13g around the center hole 13b thereof. The housing 13 further has a sensor retainer 13e and a pair of supporting leg portions 13d formed by bending at the right angles. The housing 13 formed by pressing in this manner is placed on and secured to the top surface of a rotating machine 15 (used as supporting means for supporting housing 13) by means of screws 23 which extend through the perforations 13g of the housing 13 and are screwed into threaded holes 15a formed in the top surface of the rotating machine 15. It is to be noted that a bonding agent (not shown) is applied to arbitrary locations of contacting portions between the housing 13 and the rotating machine 15 to secure them to each other surer.

The rotating machine 15 has a rotary shaft 16 which extends upwardly through the center hole 13b of the housing 13, and a magnetic drum 17 is securely mounted on the rotary shaft 16. The magnetic drum 17 is composed of a rotary member 18 made of aluminum or some other suitable metal, and a magnetic member 19 made of plastic magnet or the like and securely mounted on an outer circumferential face of the rotary member 18. The magnetic member 19 has a magnetization pattern (not shown) formed continuously on an outer circumferential periphery thereof by a magnetic recording technique such that a plurality of magnetic pole pairs are arranged at equal circumferential intervals so that adjacent successive pairs of magnetic poles have the polarities N, S, S, N, N, S, S, N, . . . .

The sensor mounting portion 13e of the housing 13 has an outer wall which serves as a flat attracting face 13f while a magnetic sensor 20 is secured by an adhesive to an inner wall of the sensor mounting portion 13e, and a gap g is formed between the magnetic sensor 20 and an outer circumferential face of the magnetic drum 17. The magnetic sensor 20 is composed of a pair of magneto-resistance effect elements which are arranged in a circumferentially spaced relationship and separated by a distance equal to $np + \frac{1}{4} \cdot p$ where p is a pitch of the magnetic poles of the magnetization pattern on the magnetic drum 17 and n is an integer.

A printed circuit board 26 on which circuit components of a signal processing circuit are carried is placed above the magnetic drum 17. The printed circuit board 26 is secured to the housing 13 by means of fitting the ends of the supporting leg portions 13d of the housing 13 into a pair of mounting holes 27 formed in the printed circuit board 26 and soldering them. The printed circuit board 26 and the magnetic sensor 20 are electrically connected to each other by a lead line 28 which may be a flexible flat cable. The printed circuit board 26 is further connected to an external controlling circuit by means of a harness 30. A cover 29 is provided for protecting the housing 13, magnetic drum 17, magnetic sensor 20, printed circuit board 26 and so on described above from external dust and so on.

Subsequently, a process of adjusting the gap g between the magnetic drum 17 and the magnetic sensor 20 will be described with reference to FIGS. 7 and 8 in which a gap adjusting device 31 is shown.

Figure 7:
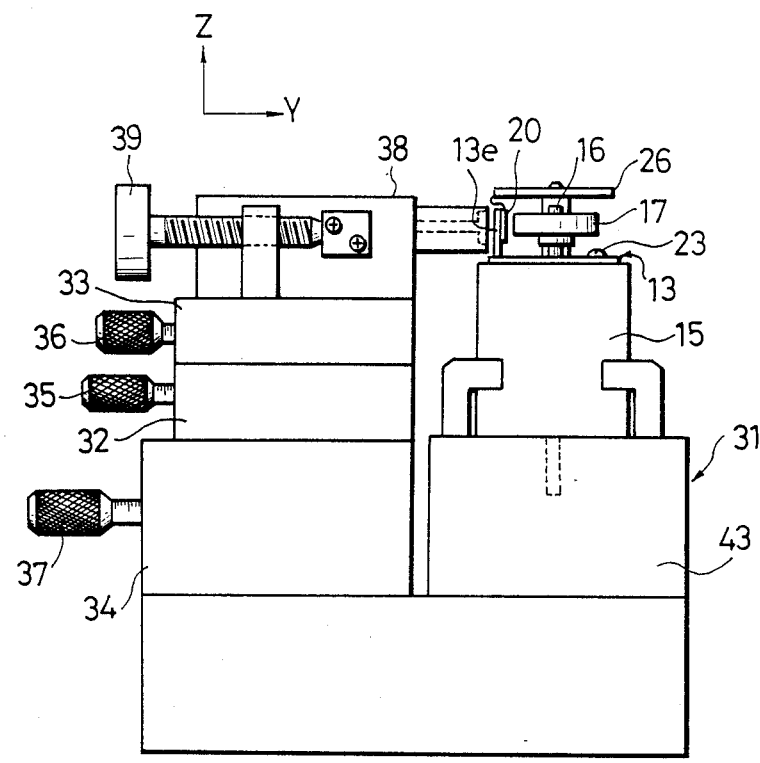
FIG. 7 is a side elevational view of a gap adjusting device for the rotary encoder device of FIG. 5.
Figure 8:
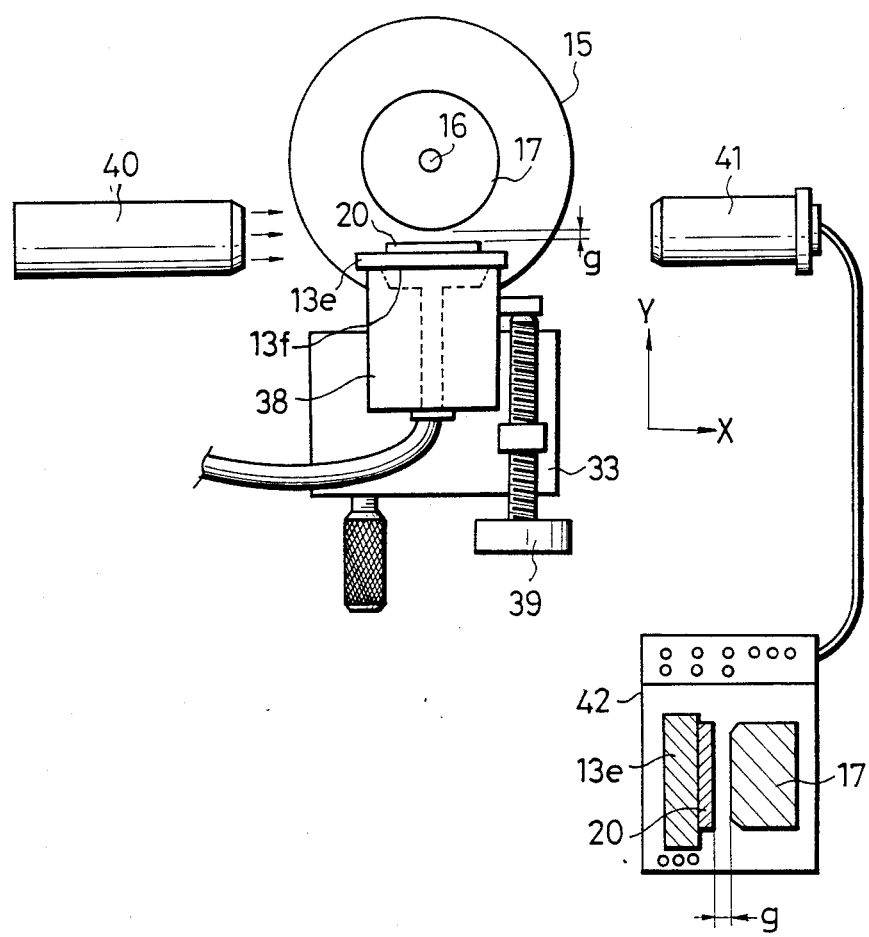
FIG. 8 is a plan view of the magnetic gap adjusting device of FIG. 7.

The gap adjusting device 31 includes an X-axis stage 32, a Y-axis stage 33 and a Z-axis stage 34 which are moved back and forth in the directions indicated by arrow marks X, Y and Z in FIGS. 7 and 8 by turning knobs 35, 36 and 37, respectively An attracting jig 38 can be moved back and forth in the Y direction by turning a feed dial 39. The attracting jig 38 terminates in a flat face parallel to the X-Z plane, and an attracting pump (not shown) is connected to a rear end of the attracting jig 38. As apparently seen from FIG. 8, a light emitting member 40 and a camera 41 are placed at the of opposite sides of the attracting jig 38 interposed therebetween, and a monitor display 42 is connected to the camera 41. A motor retaining table 43 is placed side by side with the Z-axis stage 34.

In adjusting the gap g, at first the rotating machine 15 on which the whole magnetic rotary encoder including the housing 13, magnetic drum 17 and so on except the cover 29 is assembled is secured to the motor retaining table 43 of the gap adjusting device 31 with the axial line of the rotary shaft 16 along the Z-axis. In this instance, the individual screws 23 are held in a loosened condition so that the housing may move by the amount of clearance between the screws 23 and the perforations 13g of the housing 13.

Subsequently, the attracting pump (not shown) is rendered operative to cause the attracting jig 38 to attract the attracting face 13f of the sensor mounting portion 13e of the housing 13 thereto by vacuum. After the housing 13 is attracted and held by the attracting jig 38 in this manner, the knobs 35, 36 and 37 are individually turned to move the X-axis stage 32, Y-axis stage 33 and Z-axis stage 34 in the directions indicated by the arrow marks X, Y and Z, respectively, until the center of the magnetic sensor 20 coincides with the center of the magnetic drum 17. Such positioning needs not be performed for individual magnetic rotary encoder devices of the same model wherein the relative dimensions of the rotating machine 15, housing 13 and so on do not vary.

After that, the feed dial 39 is turned to advance the attracting jig 38 in the direction of the arrow mark Y to move the magnetic sensor 20 to the circumferential face of the magnetic drum 17. This motion is displayed on the monitor display 42 by way of the camera 41, and the feeding movement of the attracting jig 38 is stopped at a point of time when the magnetic sensor 20 comes in contact with the circumferential face of that magnetic drum 17. Here, the gap g is as] zero, and a gauge (not shown) is set to zero.

After the gap g is set to the zero position, the attracting jig 38 and the housing 13 are retracted in the direction indicated by the arrow mark Y by means of the feed dial 39 to gradually move the magnetic sensor 20 away from the circumferential face of the magnetic drum 17. Here, if the motor of the rotating machine 15 is driven to rotate, then an output signal is delivered from the magnetic sensor 20. Thus, at a point of time when the output signal of the magnetic sensor 20 comes to exhibit an optimum waveform, the feeding movement of the attracting jig 38 is stopped. Here, the position of the gap is determined to be appropriate, and a value indicated by the gauge then is read out in order to determine if the magnetic sensor 20 is indeed positioned at the appropriate position.

After the gap g is adjusted in this manner, the individual screws 23 are tightened to secure the housing 13 to the top surface of the rotating machine 15 while the the housing 13 is kept attached by vacuum to the attracting jig 38. At this time, if a bonding agent is applied to base portions of the supporting leg portions 13d of the housing 13, then the housing 13 will be secured more surely.

Finally, the attracting pump is stopped and the rotating machine 15 is removed from the gap adjusting device 31, and then, if necessary, a bonding agent is applied to base portions of the bent portions of the sensor retainer 13e. After that, the cover 29 is mounted on the rotating machine 15, thereby obtaining such a magnetic rotary encoder as shown in FIG. 5.

Figure 9:
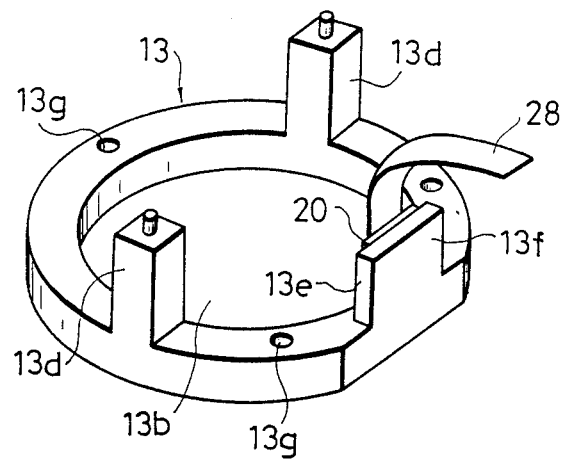
FIG. 9 is a perspective view showing a modified form of housing of the encoder shown in FIGS. 1 and 2.
Figure 10:
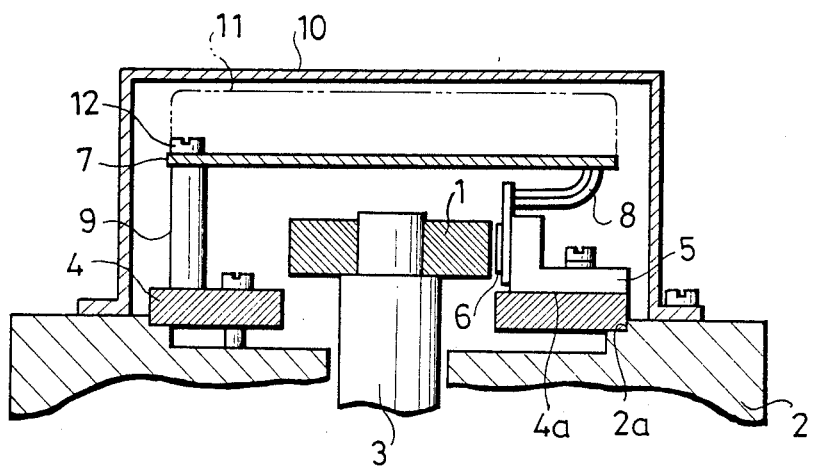
FIG. 10 is a sectional view showing a conventional magnetic rotary encoder device.

While in the embodiment described above the housing 13 is formed from a metal plate, it may otherwise be formed by molding from a synthetic resin material as shown in FIG. 9 In this case, the printed circuit board 26 may be placed on and secured to upper ends of the supporting leg portions 13d of the housing 13 by heat caulking or the like.

Further, the sensor retainer 13e and the housing 13 do not have to be in an integral relationship, and at any rate, it is only necessary that, after the appropriate gap has been set with the sensor retainer held attracted to the attracting jig, the sensor retainer be secured to the datum clamp face directly or by way of some other member.

Further, while in the embodiment described above an output signal of the magnetic sensor 20 and actual measurement by the camera 41 are both used as the means for setting the gap g, this invention is not limited to this way of gap setting, and it is possible, for example, to adjust the gap g using only the output signal without measuring the gap by a gauge or only measuring the gap by a gauge without using the output signal.

In addition, while in the embodiment described above the magnetic scale 17 is a magnetic drum, it is a matter of course that the present invention can be applied also to a magnetic disk.

Having now fully described the invention, it will be apparent to one of ordinary skill in the art that many changes and modifications can be made thereto without departing from the spirit and scope of the invention as set forth herein.

What is claimed is:

1. A magnetic encoder device, comprising:
   a magnetic scale having thereon a magnetic code which can be detected by a magnetic sensor;
   a sensor retaining member for securely retaining said magnetic sensor with a gap between said magnetic scale and said magnetic sensor to allow relative rotation between said magnetic scale and said magnetic sensor;
   a housing member to which said sensor retaining member is secured;
   first bonding agent for securing said housing member and a first portion of said sensor retaining member adjacent said housing member to each other; and
   a second bonding agent for securing said housing member and a second portion of said sensor retaining member which is remote from said first portion, said second bonding agent being softer than said first bonding agent.

2. A magnetic encoder device according to claim 1, wherein said second bonding agent is a temporary bonding agent.

3. A magnetic encoder device, comprising:
   a magnetic scale mounted for movement and having thereon a magnetic code which can be detected by a magnetic sensor;
   a housing;
   a sensor retainer formed in an integral relationship on said housing and having said magnetic sensor securely mounted thereon, for retaining said sensor at a predetermined distance from said magnetic scale;
   a supporting element integral with said housing;
   electric circuit means for receiving signals from said magnetic sensor;
   said sensor retainer having thereon an attracting face facing away from said magnetic scale and said magnetic sensor and adapted for being attached to an attracting jig.

4. A magnetic encoder device according to claim 3, further comprising securing means for securing said housing to a member on which said magnetic scale is supported for pivotal motion.

5. A magnetic encoder device according to claim 4, wherein:
   said housing has a mounting hole;
   aid securing means comprises a male screw inserted through said mounting hole and having a thread ridge which has an outer diameter smaller than the inner diameter of said mounting hole by a dimension sufficient to allow predetermined adjustment of the relative position of said magnetic scale and said magnetic sensor by moving said housing substantially perpendicularly to the shank of said screw.

6. A magnetic encoder device according to claim 3, wherein said attracting face is a flat face.

7. A magnetic encoder device as in claim 1, further comprising a holding member secured to said housing member and holding said second portion of said sensor retaining member to said housing member so as to impede movement of said retaining member relative to said housing member.

8. A magnetic encoder device comprising:
   a magnetic rotary member;
   a magnetic sensor for detecting a motion of said magnetic rotary member;
   a sensor retainer, said magnetic sensor being mounted thereon;
   a housing, said sensor retainer being supported thereon and said housing and said magnetic rotary member having substantially equivalent coefficients of thermal expansion;
   first means for securing a first portion of said sensor retainer to said housing, said first portion being proximate to said sensor; and
   second means for securing a second portion of said sensor retainer to said housing;
   wherein said second securing means yields to stress easier than said first securing means.

9. A magnetic encoder device as in claim 8, further comprising a holding member for resistively holding said sensor retainer to said housing.

10. A magnetic encoder device as in claim 8, wherein said sensor retainer has a flat surface adapted for attachment to an attracting jig for adjusting a gap between said magnetic sensor and said magnetic rotary member and for holding said sensor retainer in a fixed position while said second securing means is applied.

* * * * *

UNITED STATES PATENT AND TRADEMARK OFFICE
CERTIFICATE OF CORRECTION

PATENT NO. : 4,959,574
DATED : September 25, 1990
INVENTOR(S) : Hidemasa Suzuki et al.

It is certified that error appears in the above-identified patent and that said Letters Patent is hereby corrected as shown below:

On the title page item [54] and in column 1, lines 1 and 2, the title should read --PRECISION GAP MAGNETIC ENCODER DEVICE AND METHOD OF MANUFACTURE THEREOF--.

In the Abstract

Line 12, delete "and"

Line 13, "secured. A first" should read --secured, and a first--

Line 13, "second," should read --second--

Line 14, "secure" should read --for securing--

In the Claims

Col. 10, line 20, "aid " should read --said--

Signed and Sealed this

Twenty-first Day of April, 1992

Attest:

HARRY F. MANBECK, JR.

*Attesting Officer*　　*Commissioner of Patents and Trademarks*